March 6, 1956 G. S. ELLIS 2,737,403
SELF-FLARING FITTING FOR TUBES
Filed Oct. 15, 1952
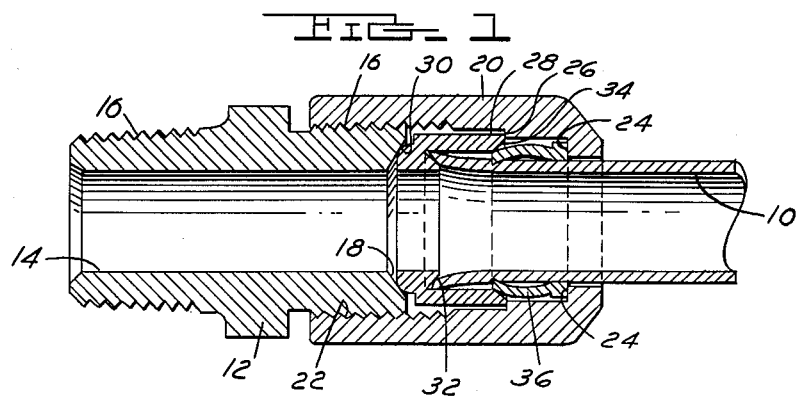
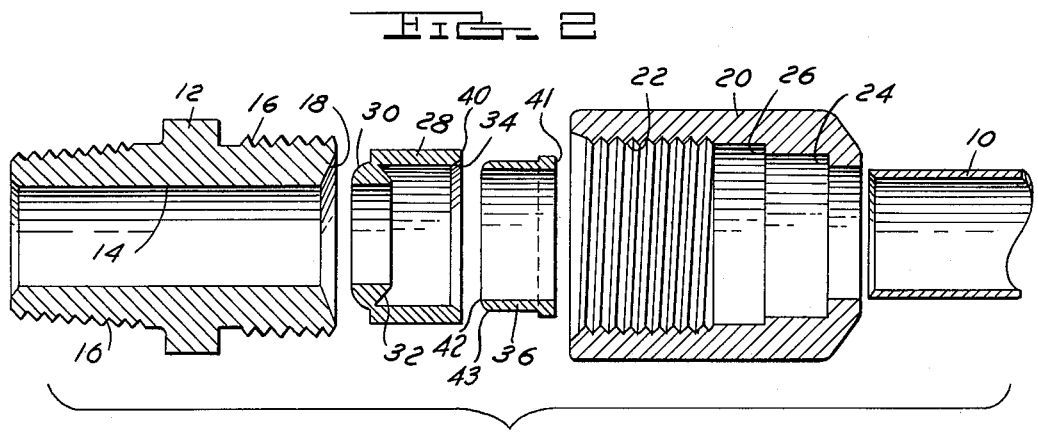
INVENTOR.
GEORGE S. ELLIS
BY
Burton & Parker
ATTORNEYS

United States Patent Office 2,737,403
Patented Mar. 6, 1956

2,737,403

SELF-FLARING FITTING FOR TUBES

George S. Ellis, Van Dyke, Mich., assignor to L & L Manufacturing Company, Van Dyke, Mich., a corporation of Michigan Application October 15, 1952, Serial No. 314,898

1 Claim. (Cl. 285—122)

This invention relates to an improved tubular fitting.

An object is to provide a tubular fitting which is simple and inexpensive and which will provide a tight fitting connection between separable tubular conduit parts adapted to contain fluid under relatively high compression and which parts are easily manipulated to make and break the joint formed by the fitting.

The fitting is so constructed that the assembly of relatively short lines is facilitated and a connection can be easily and quickly made with one end of the tube which is received within the fitting. Repeated assembly and disassembly may be made without impairing the effectiveness of the seal. The fitting is particularly designed to couple one end of a tube with a tubular body coupling in such a manner that the connection may be readily made and the resulting joint forms a tight seal against leakage at all times. The fitting includes a socket member into which a tube is forced with the forward end of the tube being slightly flared outwardly into an undercut by an internal outwardly and forwardly slanting means. The tube is forced into the undercut by a means which engages the forward portion of the tube and moves the tube forwardly a predetermined amount, this means including a gripping means having a tube engaging means which is forced into tube engagement by a cam system. This means also includes moving means to cause tube engagement and seating and further includes stop means on the fitting for limiting the movement of the tube to a predetermined amount such that the precise degree of flaring is obtained without excessive gripping pressure on the forward portion of the tube.

Other objects, advantages and meritorious features will more fully appear from the following specification, claim and accompanying drawing, wherein:

Fig. 1 is a cross sectional view through a fitting embodying my invention, with the parts coupled together;

Fig. 2 is a cross sectional view through the same parts but showing the parts disassembled.

A tube such as would be used with a fitting of this character is indicated in the drawing by the numeral 10. A coupling on the body is indicated by the numeral 12. This body exhibits a tubular passageway 14. It is externally threaded at both ends as indicated by the numeral 16. At one threaded end it is provided with an internal beveled circumferential face 18.

A nut 20 is internally threaded as at 22 to be threadedly engaged upon the body as shown in Fig. 1. This nut is provided with two internal circumferential shoulders. One shoulder is indicated by the numeral 24 and is shown as disposed in proximity to the unthreaded end of the nut. The other shoulder is indicated by the numeral 26 and is disposed between the first shoulder 24 and the internal threaded portion of the nut. The second shoulder has a greater diameter than the first shoulder. The nut is of such a size as to receive the end of the tube 10, as shown in Fig. 1.

There is a tubular socket member 28 which is adapted to be received within the nut, as shown in Fig. 1. At one end this socket member is provided with a circumferential arcuate face 30 forming a main annular sealing seat at 30 of convex shape adapted to seat against the beveled face 18 of the body member forming a circumferential line contact therewith, as shown in Fig. 1. This socket member is provided with an internal circumferential undercut 32. The forward end of the tube 10 is adapted to seat upon the beveled face of this undercut which provides the internal outwardly and forwardly slanting means or surface 32 as shown in Fig. 1 and to be flared outwardly thereover. The purpose of the flare is to combat the tendency of the tube to collapse and to present a diameter which cannot be withdrawn through the sleeve. The end of the socket opposite the body engaging end is provided with an internal circumferential beveled face 34 which provides an outwardly and rearwardly slanted cam means or surface at 34. The socket is receivable within the nut and one end thereof provides an annular stop 40 which bears against the internal second annular shoulder 26 of the nut and the opposite end bears against the body, all as shown in Fig. 1.

There is a gripping sleeve 36 which is receivable within the nut encircling the tube, as shown in Fig. 1. This sleeve has an axial dimension which is greater than the axial spacing apart of the shoulders 24 and 26 of the nut. This sleeve has an external diameter which is greater than the internal diameter of the socket. When the sleeve is received within the nut about the tube, the rearward end 41 of the sleeve bears against the first annular shoulder 24 of the nut and the opposite end of the sleeve at which is located the annular tube engaging means 42 and the annular cam follower means 43 bears against the beveled face 34 of the socket.

As the nut or moving means 20 is tightened upon the body the sleeve is urged telescopically against the beveled face 34 of the socket and is compressed inwardly against the tube 10. The end of the sleeve grips the tube 10 so as to urge the tube inwardly upon the beveled face of the undercut 32, flaring the tube slightly outwardly and holding the tube tightly against such undercut. The end of the sleeve forms a tight gripping seal about the tube. The opposite end of the sleeve seats against and is supported by the shoulder 24 of the nut. A pressure seal is effected between the arcuate face 30 of the socket and the beveled face 18 of the body and along the line of engagement of the end of the sleeve with the tube and the end of the sleeve with the beveled face 34 of the socket. At such point, as shown in Fig. 1 of the drawing, the shoulder 26 bears against the end of socket 28 thereby limiting further compression of the sleeve 36 about the tube 10.

What I claim is:

A fitting for attachment to the forward portion of a tube comprising a threaded coupling having an annular, substantially frusto-conical, rear sealing face; a tubular socket member having an internal circumferential undercut forming an internal outwardly and forwardly slanting annular surface for outwardly flaring and completely housing the forward end of a tube upon movement of the tube end into engagement therewith, an annular outwardly and rearwardly slanted cam surface formed on the inside peripheral edge of the rearward end of said tubular socket member, the innermost portion of said cam surface being located outwardly of the innermost portion of said slanting annular surface, an annular stop provided on said socket member outwardly of said slanted cam surface, and a main annular sealing seat of convex shape formed at the forward end of said tubular socket in sealing engagement with the sealing face of said threaded coupling; and means for gripping the forward portion of the tube and for forcing the forward end of the tube against said slanting annular surface and into housed engagement therewith including a gripping sleeve having an annular tube engaging means at the forward inner end edge of said sleeve positioned radially outwardly of the innermost portion of said slanting annular surface when in non-gripping condition, an annular cam follower means at the forward end portion of the gripping sleeve operatively engaging said slanted cam surface, the rearward end of said gripping sleeve having an outside diameter less than the outside diameter of said annular stop, and moving means threadedly engaging said threaded coupling and housing said tubular socket member, said gripping sleeve, and said forward portion of said tube, said moving means having a first annular shoulder in operative engagement with said sleeve rearward end for producing relative telescoping movement between said slanted cam surface and said cam follower means for forcing said tube engaging means inwardly and forwardly, said moving means having a second annular shoulder axially aligned for abutment with said annular stop for limiting said relative telescopic movement to a predetermined amount.

References Cited in the file of this patent

UNITED STATES PATENTS

| | | |
|---|---|---|
| 2,313,323 | Cowles | Mar. 9, 1943 |
| 2,326,929 | Cowles | Aug. 17, 1943 |
| 2,497,274 | Richardson | Feb. 14, 1950 |
| 2,511,134 | Stramberg | June 13, 1950 |
| 2,522,785 | Hanson | Sept. 19, 1950 |
| 2,523,135 | Mercier | Sept. 19, 1950 |

FOREIGN PATENTS

| | | |
|---|---|---|
| 466,516 | Canada | July 11, 1950 |
| 691,001 | Germany | May 14, 1940 |